United States Patent
Copley et al.

(10) Patent No.: US 6,421,440 B1
(45) Date of Patent: *Jul. 16, 2002

(54) METHOD FOR SIGNALLING CONNECTION CONTROL PART MESSAGE LOOP PREVENTION

(75) Inventors: Jeffrey D. Copley, Garland; Thomas L. Hess, Plano, both of TX (US)

(73) Assignee: Alcatel USA Sourcings, L.P., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/281,635

(22) Filed: Mar. 30, 1999

Related U.S. Application Data

(63) Continuation of application No. 08/779,966, filed on Dec. 23, 1996, now Pat. No. 5,889,847.
(60) Provisional application No. 60/026,446, filed on Sep. 12, 1996.

(51) Int. Cl.$^7$ .......................... H04M 7/00; H04L 12/28
(52) U.S. Cl. ...................... 379/219; 379/230; 370/254
(58) Field of Search ................. 379/229, 230, 379/231, 219; 370/254, 248, 255, 396, 400, 475

(56) References Cited

U.S. PATENT DOCUMENTS

| 5,014,262 A | 5/1991 | Harshavardhana ........... 370/16 |
| 5,533,114 A | 7/1996 | Ballard et al. .............. 379/220 |
| 5,721,728 A | 2/1998 | Fowler et al. .............. 370/250 |

*Primary Examiner*—Ahmad F. Matar
*Assistant Examiner*—Benny Q. Tieu
(74) *Attorney, Agent, or Firm*—Baker Botts, LLP; V. Lawrence Sewell; Craig A. Hoersten

(57) ABSTRACT

A method (100) for preventing message looping in a telecommunications network (70) includes the steps of receiving a UDT/S query message, determining a next destination for processing the query message and a route for delivering the query message to the next destination (102). A determination is then made as to whether the route to the next destination is XUDT/S capable (104). The UDT/S query message is converted to an XUDT/S format by inserting a hop counter (38) therein if the route is XUDT/S capable (108). The query message is then delivered to the next destination via the route (110). The hop counter (38) in the query message is then decremented at the next destination in response to receiving a message of the XUDT/S format (112). A message loop error is recognized and processed when the hop counter (38) reaches a predetermined value.

13 Claims, 2 Drawing Sheets

METHOD FOR SIGNALLING CONNECTION CONTROL PART MESSAGE LOOP PREVENTION

CROSS-REFERENCE TO RELATED APPLICATIONS

This application claims the benefit of U.S. Provisional Application No. 60/026,446, entitled Apparatus and Method for Signalling Connection Control Part Message Loop Prevention, filed on Sept. 12, 1996.

This application is a continuation of U.S. application Ser. No. 08/779,966 filed Dec. 23, 1996, now U.S. Pat. No. 5,889,847.

This patent application is related to co-pending U.S. patent application, Ser. No. 08/771,475, titled Apparatus and Method for the Detection and Elimination of Circular Routed SS7 Global Title Translated Messages in a Telecommunications Network, filed on Dec. 23, 1996.

TECHNICAL FIELD OF THE INVENTION

This invention is related in general to the field of telecommunications. More particularly, the invention is related to a method for signalling connection control part message loop prevention.

BACKGROUND OF THE INVENTION

The network evolution as a result of the recent telecommunications bill has resulted in the need for global title databases that require complex and precise inter-network coordination to ensure proper delivery of Signalling System No. 7 (SS7) Signalling Connection Control Part (SCCP) messages. This newly added requirement and complexity has increased the burden on network administrators and administration systems. Any inaccuracies occurring during the provisioning process of the global title databases by the network administrators and administration systems can result in SCCP message looping. SCCP message looping occurs as a message is routed repeatedly through a number of network elements in the telecommunications network, without ever reaching its final destination.

The recently approved version of ANSI SS7-SCCP-1996 standards provide procedures for the prevention of SCCP message looping. These procedures, however, require network services that are sending SCCP messages utilize the extended unitdata (XUDT) and extended unitdata service (XUDTS) defined messages. The XUDT and XUDTS messages have an SCCP hop counter parameter that is used to count the number of times a message has been processed by a network element, so that the message can be terminated if it has traversed a predetermined number of network elements.

Currently, XUDT and XUDTS messages are not supported in the telecommunications network. It is very costly for network providers to modify existing services from the UDT and UDTS message formats which are currently in use to the generation of XUDT and XUDTS message formats. The modification would require changes to every service switching point (SSP), signal transfer point (STP), and service control point (SCP) in the service provider's network.

SUMMARY OF THE INVENTION

Accordingly, a need has arisen for a solution to message looping without costly modifications to every service switching point, signal transfer point, and service control point in the telecommunications network.

In one aspect of the invention, a method for preventing message looping in a telecommunications network includes the steps of receiving a UDT/S query message, determining a next destination for processing the query message and a route for delivering the query message to the next destination. A determination is then made as to whether the route to the next destination is XUDT/S capable. The UDT/S query message is converted to an XUDT/S format by changing the message type encoding and by inserting a hop counter therein if the route is XUDT/S capable. The query message is then delivered to the next destination via the route. The hop counter in the query message is then decremented at the next destination in response to receiving a message of the XUDT/S format. A message loop error is recognized and processed when the hop counter reaches a predetermined value.

In another aspect of the invention, a method for preventing message looping in a telecommunications network includes the steps of receiving a query message, and determining a next destination for processing the query message and a route for delivering the query message to the next destination. Next, a determination is made as to whether the route to the next destination is XUDT/S capable, and whether the query message is an XUDT/S message. The query message is converted to an XUDT/S message by changing the message type encoding and by inserting a hop counter therein if the route is XUDT/S capable and the query message is not an XUDT/S message. The query message is converted to a UDT/S message by changing the encoding to a UDT/S message and removing the hop counter therein if the route is not XUDT/S capable and the query message is an XUDT/S message. At the next destination, the hop counter is decremented in the XUDT/S query message. The query message is discarded if the hop counter reached a predetermined value.

BRIEF DESCRIPTION OF THE DRAWINGS

For a better understanding of the present invention, reference may be made to the accompanying drawings, in which.

DETAILED DESCRIPTION OF THE INVENTION

Figure 1:
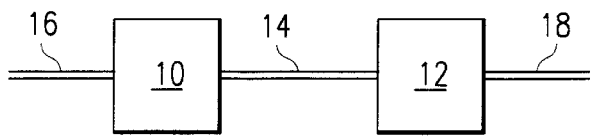
FIG. 1 is a simplified block diagram of a portion of a telecommunications network.

The preferred embodiment(s) of the present invention is (are) illustrated in FIGS. 1–5, like reference numerals being used to refer to like and corresponding parts of the various drawings.

Referring to FIG. 1, two network elements 10 and 12 are coupled together with a link set 14. Network element is further coupled to at least one other network element (not shown) with a link set 16, and network element 12 is also coupled to at least one other network element (not shown) with a link set 18. Network elements 10 and 12 may be any network element capable of Signalling System No. 7 (SS7) processing, such as a signal transfer point (STP) or a service control point (SCP) residing in the telecommunications network.

According to the teachings of the present invention, network elements 10 and 12 are capable of converting unitdata (UDT) and unitdata service (UDTS) messages to extended unitdata (XUDT) and extended unitdata service (XUDTS) messages, to prevent signalling connection control part (SCCP) message looping. In operation, an SCCP UDT query message is received over link set 16 by network element 10. The query message is processed per ANSI SS7-SCCP procedures, such as global title translation (GTT). A successful SCCP procedure at network element 10 results in an SS7 address of the next network element to receive and process the message. Upon selection of a route to the determined destination, for example network element 12, link set parameters for the chosen route, i.e. link set 14, is examined to determine if the route is XUDT capable. If the route is marked as XUDT capable, the message is converted to an XUDT message. The XUDT message is then sent over link set 14 to network element 12.

Figure 2:
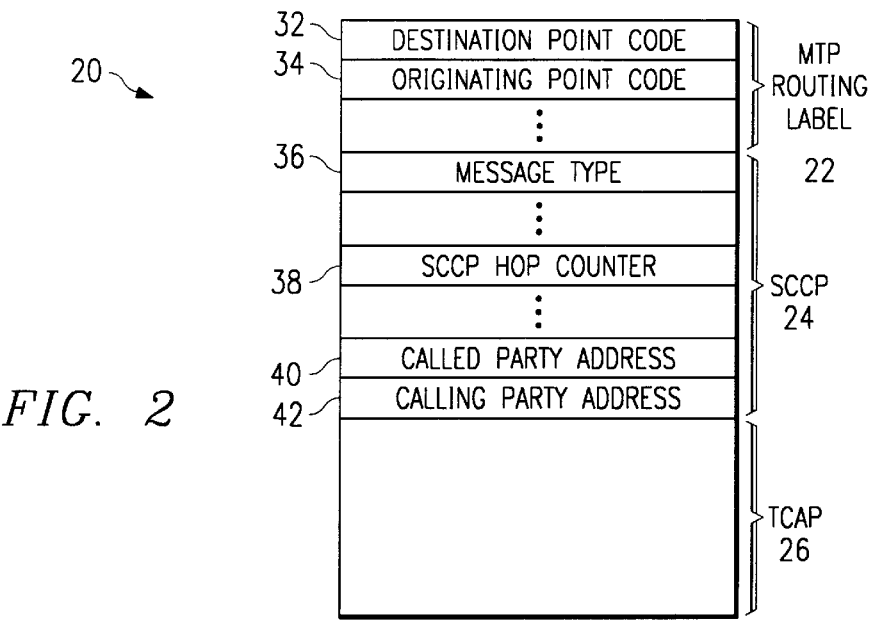
FIG. 2 is a simplified XUDT message format showing selected fields.

Referring to FIG. 2, a simplified exemplary message format 20 for an XUDT message is shown. Message format 20 includes a message transfer part (MTP) routing label 22, a SCCP 24, and a transaction capabilities application part (TCAP) 26. MTP routing label 22 includes a destination point code field 32 and an originating point code field 34. Destination and originating code fields 32 and 34 respectively identify an STP that is capable of performing global title translation and an STP that sent the query message for the global title translation procedure. SCCP 24 includes a message type field 36, which may be used to identify whether a message is of the type UDT, XUDT, UDTS, or XUDTS. The following table provides the bit pattern specified by ANSI SS7-SCCP.

| MESSAGE TYPE | BIT PATTERN |
| --- | --- |
| UDT | 0000 1001 |
| XUDT | 0001 0001 |
| UDTS | 0000 1010 |
| XUDTS | 0001 0010 |

An XUDTS message (not shown) is similarly formatted as an XUDT message to also include a destination point code, an originating point code, and a message type field, which are used in a similar manner as described above.

SCCP 24 of XUDT and XUDTS messages further includes an SCCP hop counter 38. SCCP hop counter 38 is used to provide a record of the number of network elements that handle an XUDT or XUDTS message. SCCP hop counter 38 is first initialized to a predetermined number, and is decremented by each network element that processes the message. When SCCP hop counter 38 contains a zero value or a second predetermined value, the message may be terminated due to excessive routing, which indicates message looping. When XUDT and XUDTS message formats are not used, SCCP message looping may go on undetected as a result of global title translation database errors. These databases are typically located at the signal transfer points which are the network elements that traditionally perform the SCCP global title translation procedure to obtain the necessary routing information to continue routing the message. Therefore, the XUDT and XUDTS message formats are developed in response to the message looping problem that is capable of causing serious network degradation and possible isolation.

Returning to the scenario shown in FIG. 1, when the chosen route to route the message to the next network element, network element 12, is XUDT capable, the message is converted to an XUDT message by network element 10. The conversion includes changing the message type field to a bit pattern representing the XUDT message, and inserting and initializing a SCCP hop counter according to provisioning at network element 10. The message is then sent over link set 14 to network element 12. Since link set 14 is marked as XUDT capable at network element 10, it is assumed that the other end of link set 14 terminates in an XUDT capable network element, i.e. network element 12. Upon receipt of the converted XUDT message by network element 12, it invokes normal ANSI SS7-SCCP XUDT procedures. As part of the SCCP procedures for XUDT messages, the SCCP hop counter is decremented and examined to determine if it has reached zero. Predetermined SCCP error procedures are invoked if the decrement results in a zero value in the SCCP hop counter. If the SCCP hop counter value is not zero, SCCP procedures are continued at network element 12.

If the result of the SCCP procedure carried out at network element 12 is a new route, link set 18, it is determined whether link set 18 is provisioned as XUDT capable. If link set 18 is XUDT capable, then the XUDT message is sent over link set 18 per normal SCCP procedures. If on the other hand, link set 18 is not XUDT capable, network element 12 converts the XUDT message to an UDT message. All parameters unique to the XUDT message format are modified or discarded, including message type field 36 (FIG. 2) and SCCP hop counter 38 (FIG. 2). The resultant UDT message is then sent over link set 18 to the next network element.

Figure 3:
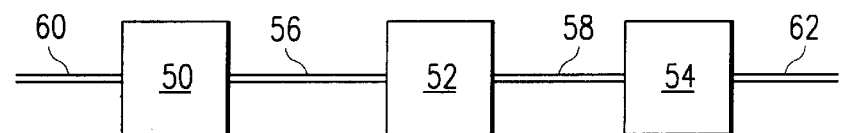
FIG. 3 is another simplified block diagram of a portion of a telecommunications network.

FIG. 3 illustrates a through-switched XUDT message scenario. FIG. 3 shows network elements 50–54 coupled together via link sets 56 and 58. Network element 50 is further coupled to another network element by a link set 60, and network element 54 is coupled to another network element by a link set 62. Network element 50 desires to send an XUDT message through network element 52 for SCCP processing at network element 54. Network element 50 first sends the XUDT message to network element 52. SCCP procedures are not invoked at network element 52. MTP routing at network element 52, which performs route selection, selects link set 58 for routing the received XUDT message to network element 54. Upon selecting link set 58, provisioning at network element 52 for link set 58 is checked to determine if the terminating end of link set 58, i.e., network element 54, is XUDT capable. If network element 54 is XUDT capable, the XUDT message is sent to network element 54 over link set 58 per normal routing procedures. Note that because network element 52 did not invoke SCCP procedures, SCCP hop counter 38 is not decremented at network element 52.

If network element 54 is not XUDT capable, the XUDT message is converted to a UDT message by network element 52. The conversion includes changing the bit pattern in message type field 36 to reflect a UDT message, and removing SCCP hop counter 38. The resultant UDT message is then sent over link set 58 to network element 54.

Figure 4:
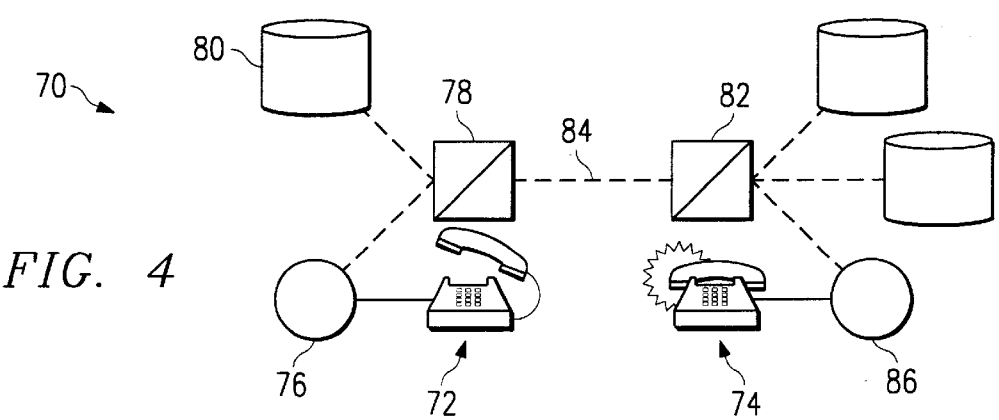
FIG. 4 is another simplified block diagram of a portion of a telecommunications network.

FIG. 4 provides a block diagram of a portion of an exemplary telecommunications network 70 as a further illustration of the operations of the instant invention. A calling-party 72 picks up the telephone to call a called party 74. A service is invoked by calling party 72 that results in an SCCP UDT query message. The query message is routed by a switch 76 and sent to a network element 78, such as a STP, to perform normal SCCP procedures. The SCCP procedure performed by network element 78 may include global title translation on a six-digit called number basis, for example. A successful SCCP procedure results in an SS7 address of a next destination to send the query message to continue processing. Upon the selection of a route to the determined destination, for example network element 80, link set parameters are examined to determine if the route chosen is XUDT capable. If the route is XUDT capable, then the UDT query message is converted to an XUDT message by modifying the message type field and inserting and initializing an SCCP hop counter in the message according to ANSI SS7-SCCP. The marking of the link set to network element 80 as being XUDT capable indicates that network element 80 is capable of performing XUDT procedures.

The converted XUDT query message is then sent to network element 80, which may be an SCP, to continue the global title translation on a ten-digit basis. At network element 80, as part of the SCCP procedure, the SCCP hop counter is decremented and examined to determine if it has reached zero. If it is not zero, the SCCP procedures continue; if it is zero, then error procedures are invoked which may terminate the message.

In the present example, the SCCP procedure continues at network element 80 and results in a new destination for the query message, which may be network element 82, so that another ten-digit global title translation may be performed. To send the message to network element 82, network element 80 makes a routing selection to network element 82, which is switched through network element 78. Network element 78 performs MTP routing and selects link set 84 to send the XUDT query message to network element 82. Network element 78 further examines link set 84 to determine if it is marked as being XUDT capable. If it is marked as being XUDT capable, the query message is sent to network element 82 without conversion; if it is marked as not being XUDT capable, then the XUDT query message is converted back to a UDT message before sending it to network element 82.

Subsequently, the global title translation performed by network element 82 results in a called party address, which is used to complete the call to called party 74 as switched by a switch 86.

Figure 5:
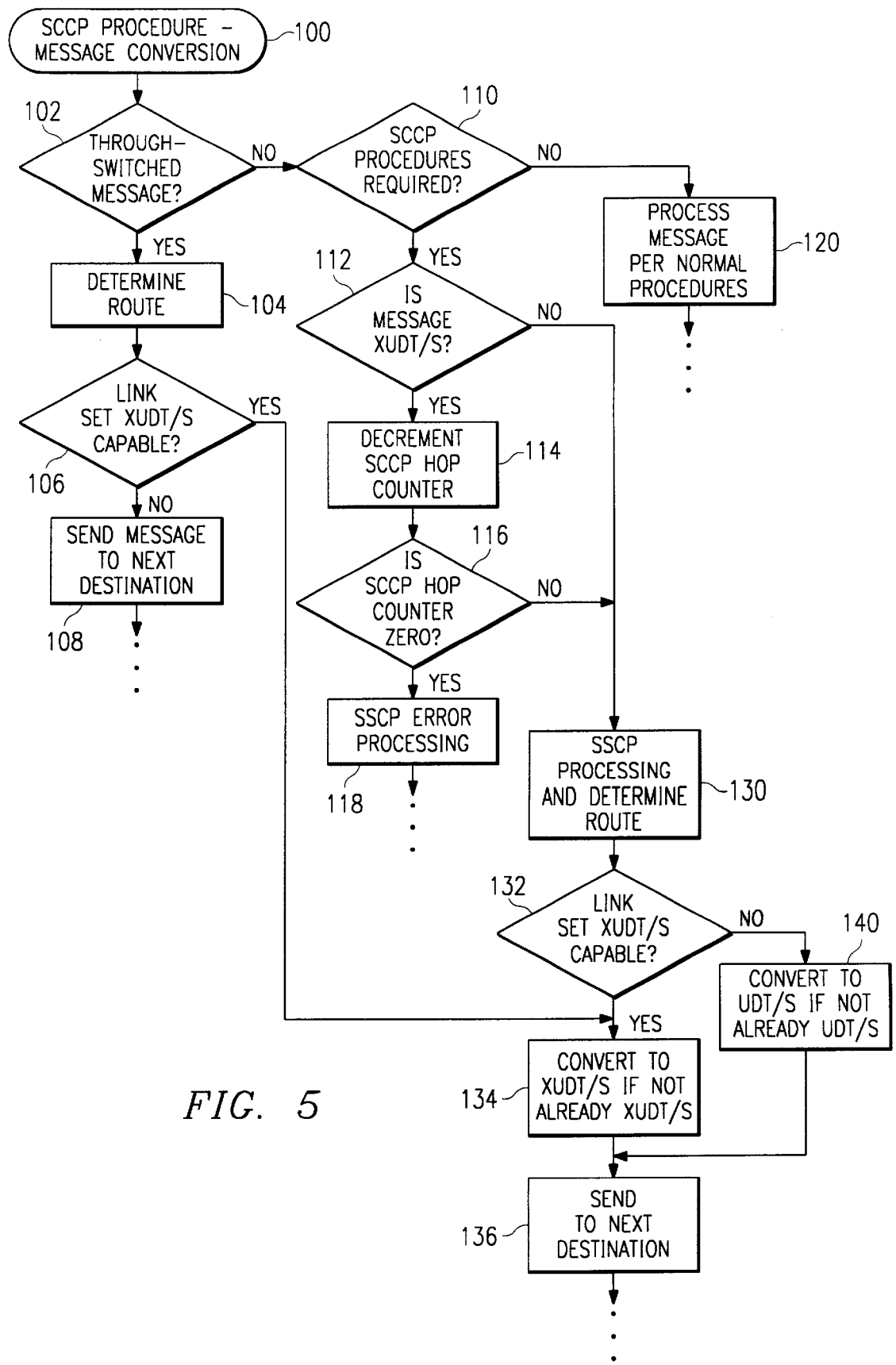
FIG. 5 is a flowchart of an exemplary SCCP procedure.

A flowchart in FIG. 5 summarizes an exemplary message conversion process 100 according to the teachings of the present invention. In block 102, normal SS7 message processing determines if the message is addressed to another network element (through-switched) or if the message is addressed to this network element. If the message is through-switched, then the route to the indicated destination is determined, as shown in block 104. After determining the route, the chosen route is checked to see if it is XUDT/S capable, as shown in block 106. If the chosen route is not XUDT/S capable, the message is sent out per normal SS7 processing, as shown in block 108. If the chosen route was XUDT/S capable, then the UDT message is converted to an XUDT (or UDTS to XUDTS) message, as shown in block 134. The message is then sent out per normal SS7 processing, as shown in block 136. If in block 102 the message was not a through-switched message, it is then determined to see if SCCP processing is required, as shown in block 110. The message is processed per the network element's normal procedures if SCCP procedures are not required, as shown in block 120. If SCCP processing is required, the message is then examined, as shown in block 112, to see if it is an XUDT or XUDTS message. If the message is an XUDT or XUDTS message, the hop counter is decremented as shown in block 114 and its value examined in block 116. The value of the hop counter is checked to see if it is zero after it is decremented, as shown in block 116. If the hop counter value is zero or some predetermined number, then SCCP error processing is performed, as shown in block 118. If the hop counter was not zero, then the network element performs SCCP processing and also determines the route, as shown in block 130. The chosen route is then checked to see if it is XUDT/S capable, as shown in block 132. If the chosen route is XUDT/S capable, then the message is not converted since it already is an XUDT/S, as shown in block 134. The message is then sent out per normal SS7 processing, as shown in block 136. If the chosen route is not XUDT/S capable, then the message is converted back to a UDT/S message per block 140 and then sent to its destination, as shown in block 136.

Referring back to block 112, if the message is not an XUDT/S message, the network element performs normal SCCP processing and also determines the route, as shown in block 130. The chosen route is then checked to see if it is XUDT/S capable in block 132. If the chosen route is XUDT/S capable, then the UDT message is converted to an XUDT (or UDTS to XUDTS) message, as shown in block 134. The message is then sent out per normal SS7 processing, as shown in block 136.

Constructed and operating in this manner, network elements that are currently in place in the network may be quickly converted to operate according to SS7-SCCP-1996 procedures to process XUDT and XUDTS messages to avoid the problem of message looping.

Although the present invention and its advantages have been described in detail, it should be understood that various changes, substitutions and alterations can be made therein without departing from the spirit and scope of the invention as defined by the appended claims.

What is claimed is:

1. A method for preventing message looping in a telecommunications network, comprising:

receiving a unit data service (UDT/S) query message;

determining a next destination for processing the query message;

determining whether the next destination is extended unit data service (XUDT/S) capable;

converting the UDT/S query message to an XUDT/S format in response to the next destination being XUDT/S capable;

inserting and initializing a hop counter in the XUDT/S format of the query message;

delivering the query message to the next destination.

2. The method of claim 1, further comprising:

receiving the query message at the next destination;

decrementing the hop counter in the query message.

3. The method of claim 2, further comprising:

determining whether the hop counter has reached a threshold value.

4. The method of claim 3, further comprising:

discarding the query message in response to the hop counter reaching the threshold value.

5. The method of claim 3, further comprising:

processing the query message in response to the hop counter not reaching the threshold value.

6. The method of claim 5, further comprising:

determining that the query message is to be routed to a further destination;

determining whether the further destination is XUDT/S capable.

7. The method of claim 6, further comprising:

delivering the query message to the further destination in response to the further destination being XUDT/S capable.

8. The method of claim 6, further comprising:

converting the query message from the XUDT/S format to a UDT/S format in response to the further destination not being XUDT/S capable;

discarding the hop counter in response to the conversion.

9. The apparatus for preventing message looping in a telecommunications network, comprising:

a signal transfer point operable to receive a unit data service (UDT/S) query message, the signal transfer point operable to determine a next destination for processing the query message, the signal transfer point operable to determine whether the next destination is extended unit data service (XUDT/S) capable, the signal transfer point operable to convert the query message from the UDT/S format to the XUDT/S format in response to the next destination being XUDT/S capable, the signal transfer point operable to insert and initialize a hop counter in the XUDT/S format of the query message, the signal transfer point operable to deliver the query message to the next destination.

10. The apparatus of claim 9, further comprising:

a service control point operable to receive the query message, the service control point being the next destination, the service control point operable to decrement a value of the hop counter, the service control point operable to compare the value of the hop counter to a threshold value, the service control point operable to perform error procedures in response to the value of the hop counter reaching the threshold value.

11. The apparatus of claim 10, wherein the service control point is operable to perform signal connection control part processing of the query message in response to the value of the hop counter not reaching the threshold value.

12. The apparatus of claim 11, wherein the service control point is operable to identify a new destination for the query message according to the signal connection control part processing, the service control point operable to route the query message to the new destination in response to the new destination being XUDT/S capable.

13. The apparatus of claim 12, wherein the service control point is operable to convert the query message from the XUDT/S format to the UDT/S format in response to the new destination not being XUDT/S capable, the service control point operable to discard the hop counter upon converting the query message to the UDT/S format.

* * * * *